(12) United States Patent
Chen et al.

(10) Patent No.: US 10,939,404 B2
(45) Date of Patent: Mar. 2, 2021

(54) USER-EQUIPMENT LOCATION AREA UPDATING METHOD, ACCESS NETWORK ENTITY, USER EQUIPMENT AND CORE NETWORK ENTITY

(71) Applicant: CHINA ACADEMY OF TELECOMMUNICATIONS TECHNOLOGY, Beijing (CN)

(72) Inventors: Li Chen, Beijing (CN); Jing Liang, Beijing (CN); Haiyang Quan, Beijing (CN); Chandrika Kumudinie Worrall, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/346,385

(22) PCT Filed: Oct. 25, 2017

(86) PCT No.: PCT/CN2017/107591
§ 371 (c)(1),
(2) Date: Apr. 30, 2019

(87) PCT Pub. No.: WO2018/082490
PCT Pub. Date: May 11, 2018

(65) Prior Publication Data
US 2020/0059884 A1  Feb. 20, 2020

(30) Foreign Application Priority Data

Nov. 4, 2016  (CN) .......................... 2016 1 0962446

(51) Int. Cl.
*H04W 24/00* (2009.01)
*H04W 64/00* (2009.01)
*H04W 8/08* (2009.01)

(52) U.S. Cl.
CPC ............. *H04W 64/00* (2013.01); *H04W 8/08* (2013.01)

(58) Field of Classification Search
CPC ..... H04W 76/25; H04W 76/28; H04W 28/02; H04W 36/00; H04W 36/0066;
(Continued)

(56) References Cited

U.S. PATENT DOCUMENTS

2009/0268635 A1  10/2009  Gallagher et al.
2011/0069664 A1  3/2011  Yin et al.
(Continued)

FOREIGN PATENT DOCUMENTS

CN  101605338 A  12/2009
CN  103220656 A  7/2013
(Continued)

OTHER PUBLICATIONS

Intel Corporation, RAN based Update Mechanism for New RAN State, 3GPP TSG RAN WG2 Meeting #95bis R2-166898, Oct. 14, 2016 (Oct. 14, 2016), section 2.
(Continued)

*Primary Examiner* — Joseph Arevalo
(74) *Attorney, Agent, or Firm* — Ladas & Parry, LLP

(57) ABSTRACT

A UE location area update method, an access network entity, a UE, and a core network entity are provided. The method includes: receiving, by an access network entity, a location-area updating request message transmitted by the UE; and transmitting a location-area updating message to the UE by the access network entity, wherein the location-area updating message at least includes target RNA information, the target RNA information is RNA information updated for the UE by the access network entity according to the location-area updating request message.

19 Claims, 10 Drawing Sheets

(58) Field of Classification Search
CPC ..... H04W 36/08; H04W 48/14; H04W 48/16; H04W 4/021; H04W 4/70; H04W 60/04; H04W 64/003; H04W 76/27; H04W 8/00; H04W 8/02; H04W 8/08; H04W 8/10
USPC ............ 455/432.1, 436, 456.6, 456.1, 456.3, 455/404.2; 370/328
See application file for complete search history.

(56) References Cited

U.S. PATENT DOCUMENTS

| | | |
|---|---|---|
| 2012/0195255 A1 | 8/2012 | Nylander et al. |
| 2012/0196599 A1* | 8/2012 | Cho ................. H04W 8/04 455/435.1 |
| 2013/0183959 A1* | 7/2013 | Mihaly ................ H04W 60/00 455/422.1 |
| 2014/0044058 A1 | 2/2014 | El-Saidny et al. |
| 2014/0256319 A1* | 9/2014 | Lee ................... H04W 68/005 455/435.1 |
| 2015/0063199 A1 | 3/2015 | Wang et al. |
| 2016/0080979 A1 | 3/2016 | Jin et al. |
| 2016/0088462 A1 | 3/2016 | Jin et al. |
| 2016/0128020 A1* | 5/2016 | Agarwal .............. H04W 68/04 370/328 |
| 2016/0183156 A1* | 6/2016 | Chin .................. H04L 61/2007 370/331 |
| 2018/0176979 A1* | 6/2018 | Ryu ........................ H04W 8/08 |
| 2018/0220289 A1* | 8/2018 | Ryu ........................ H04W 4/02 |
| 2018/0324652 A1* | 11/2018 | Ryu ........................ H04W 8/04 |
| 2019/0014515 A1* | 1/2019 | Zee ....................... H04W 48/18 |
| 2019/0021064 A1* | 1/2019 | Ryu ....................... H04W 76/27 |
| 2019/0028941 A1* | 1/2019 | Zee ................... H04W 36/0066 |
| 2019/0045368 A1* | 2/2019 | Zhou .................. H04L 41/0803 |
| 2019/0082316 A1 | 3/2019 | Peng et al. |
| 2019/0116486 A1* | 4/2019 | Kim ........................ H04W 8/10 |
| 2019/0191406 A1* | 6/2019 | Wei ....................... G01S 5/0205 |
| 2019/0246342 A1* | 8/2019 | Wang .................... H04W 36/08 |
| 2019/0364541 A1* | 11/2019 | Ryu ....................... H04W 48/18 |
| 2020/0059884 A1* | 2/2020 | Chen .................... H04W 48/08 |

FOREIGN PATENT DOCUMENTS

| | | |
|---|---|---|
| JP | 2016526327 A | 9/2016 |
| JP | 2019515593 A | 6/2019 |
| WO | 2017193286 A1 | 11/2017 |

OTHER PUBLICATIONS

International Search Report for PCT/CN2017/107591 dated Jan. 24, 2018 and its English translation provided by WIPO.
Written Opinion of the International Searching Authority for PCT/CN2017/107591 dated Jan. 24, 2018 and its English translation provided by Google Translate.
Second Office Action from CN app. No. 201610962446.1, dated Apr. 30, 2019, with English translation from Global Dossier.
Partial Supplementary European search report from EP app. No. 17866672.3, dated Jul. 5, 2019.
Written Opinion of the International Searching Authority, dated Jan. 24, 2018, with English translation from WIPO.
International Preliminary Report on Patentability, dated May 7, 2019, with English translation from WIPO.
Notification of Reasons for Refusal from JP app. No. 2019-522403, dated Jul. 21, 2020, with English translation from Global Dossier.
"3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.1.0 (Sep. 2016).

* cited by examiner

USER-EQUIPMENT LOCATION AREA UPDATING METHOD, ACCESS NETWORK ENTITY, USER EQUIPMENT AND CORE NETWORK ENTITY

CROSS-REFERENCE TO RELATED APPLICATIONS

This application is a U.S. national phase application of a PCT Application No. PCT/CN2017/107591 filed on Oct. 25, 2017, which claims a priority to a Chinese patent application No. 201610962446.1 filed in China on Nov. 4, 2016, the disclosures of which are incorporated herein by reference in their entireties.

TECHNICAL FIELD

The present disclosure relates to a field of communication technology, and specifically relates to a User-Equipment (UE) location area updating method, an access network entity, a UE, and a core network entity.

BACKGROUND

In a relevant mobile communication system, a location area of a UE includes a Core Network (CN) level location area, i.e., a location area controlled by the CN. The location area of the UE controlled by the CN is called a Tracking Area (TA). The CN may track the location area of the UE according to the TA, and the CN may find the UE easily.

In a forthcoming mobile communication system, the location area of the UE may further include a Residential Access Network (RAN) level location area, i.e., a location area controlled by the RAN. A location area of the UE controlled by the RAN is called a RAN Notification Area (RNA), the RNA may enable the RAN to find the UE easily.

SUMMARY

A method for updating a location of a User Equipment (UE), an access network entity, a UE and a Core Network (CN) entity are provided in the present disclosure.

In a first aspect, a method for updating a location area of a UE is provided in the present disclosure and includes receiving, by an access network entity, a location-area updating request message transmitted by the UE; and transmitting a location-area updating message to the UE by the access network entity, wherein the location-area updating message at least includes target Radio Access Network (RAN) notification area (RNA) information, the target RNA information is RNA information updated for the UE by the access network entity according to the location-area updating request message.

Optionally, the method further includes determining, by the access network entity according to the location-area updating request message, whether a Tracking Area Identity (TAI) list of the UE needs to be updated or not; wherein, the transmitting the location-area updating message to the UE by the access network entity, includes: under a condition that the TAI list of the UE does not need to be updated, updating the RNA information for the UE by the access network entity according to the location-area updating request message, and obtaining the target RNA information; and transmitting the location-area updating message including the target RNA information to the UE by the access network entity.

Optionally, the method further includes determining, by the access network entity according to the location-area updating request message, whether a TAI list of the UE needs to be updated or not. The transmitting the location-area updating message to the UE by the access network entity, includes: under a condition that the TAI list of the UE needs to be updated, transmitting a Tracking Area Updating (TAU) request to a Core Network (CN) entity by the access network entity according to the location-area updating request message; receiving the target TAI list transmitted by the CN entity by the access network entity, wherein the target TAI list is updated for the UE by the CN entity according to the TAU request; transmitting the location-area updating message including the target RNA information and the target TAI list to the UE by the access network entity.

Optionally, the location-area updating request message includes a RNA updating request, and the determining, by the access network entity according to the location-area updating request message, whether the TAI list of the UE needs to be updated or not, includes: obtaining information of a target cell in the RNA updating request by the access network entity; determining, by the access network entity, whether the TAI list of the UE obtained in advance includes an identifier of the target cell or not; under a condition that the TAI list includes the identifier of the target cell, determining, by the access network entity, that the TAI list of the UE needs not to be updated; and under a condition that the TAI list of the UE does not include the identifier of the target cell, determining, by the access network entity, the TAI list of the UE needs to be updated.

Optionally, the location-area updating request message including the RNA updating request includes a Radio Resource Control (RRC) message encapsulating the RNA updating request.

Optionally, the location-area updating request message includes a RNA updating request and a Tracking Area Updating (TAU) request, the method further includes: parsing the TAU request from the location-area updating request message by the access network entity and transmitting the TAU request to a Core Network (CN) entity by the access network entity; receiving a target Tracking Area Identity (TAI) list transmitted by the CN entity by the access network entity, wherein the target TAI list is a TAI list updated for the UE by the CN entity. The transmitting the location-area updating message to the UE by the access network entity, includes: transmitting the location-area updating message including the target RNA information and the target TAI list to the UE by the access network entity.

Optionally, the location-area updating request message includes a Radio Resource Control (RRC) message encapsulating the RNA updating request and a Non-Access Stratum (NAS) message encapsulating the TAU request. The parsing the TAU request from the location-area updating request message by the access network entity and transmitting the TAU request to the CN entity by the access network entity, includes: parsing the NAS message encapsulating the TAU request from the location-area updating request message by the access network entity and transmitting the NAS message to the CN entity by the access network entity. The receiving the target TAI list transmitted by the CN entity by the access network entity, includes: receiving the NAS message including the target TAI list transmitted by the CN entity by the access network entity. The transmitting the location-area updating message including the target RNA information and the target TAI list to the UE by the access network entity, includes: transmitting, by the access network entity, a RRC message including the target RNA information and a NAS message including the target TAI list to the UE.

Optionally, the location-area updating request message includes a Radio Resource Control (RRC) message encapsulating the RNA updating request and a RRC message encapsulating the TAU request. The parsing the TAU request from the location-area updating request message by the access network entity and transmitting the TAU request to the CN entity by the access network entity, includes: parsing the RRC message encapsulating the TAU request by the access network entity and transmitting a control-plane message or a user-plane message including the TAU request to the CN entity by the access network entity. The receiving the target TAI list transmitted by the CN entity by the access network entity, includes: receiving a control-plane message or a user-plane message including the target TAI list transmitted by the CN entity by the access network entity. The transmitting the location-area updating message including the target RNA information and the target TAI list to the UE by the access network entity, includes: transmitting, by the access network entity, a RRC message including the target RNA information and a RRC message including the target TAI list to the UE.

Optionally, the method further includes: updating RNA information for the UE by the access network entity according to the target TAI list and obtaining the target RNA information, wherein the target TAI list includes all cell identities corresponding to cells in the target RNA information and/or tracking area identities in a TAI list corresponding to the cells in the target RNA information.

In a second aspect, the embodiments of the present disclosure further provide a method for updating a location area of a User Equipment (UE) and the method includes: transmitting a location-area updating request message to an access network entity by the UE; receiving, by the UE, a location-area updating message transmitted by the access network entity, wherein the location-area updating message at least includes target Radio Access Network (RAN) notification area (RNA) information, the target RNA information is RNA information updated for the UE by the access network entity according to the location-area updating request message.

Optionally, the location-area updating request message includes a Radio Access Network (RAN) notification area (RNA) updating request; the location-area updating message includes the target RNA information; or the location-area updating message includes the target RNA information and a target Tracking Area Identity (TAI) list, wherein the target RAI list is a TAI list updated for the UE by a Core Network (CN) entity.

Optionally, the method further includes obtaining a current state of the UE by the UE; under a condition that the UE is in an inactive state, not transmitting a Tracking Area Updating (TAU) request by the UE, but transmitting the location-area updating request message including the RNA updating request to the access network entity.

Optionally, the location-area updating request message includes a Radio Resource Control (RRC) message encapsulating the RNA updating request, the location-area updating message includes a RRC message encapsulating the target RNA information, or the location-area updating message includes the RRC message encapsulating the target RNA information and a RRC message encapsulating the target TAI list.

Optionally, the location-area updating request message includes a RNA updating request and a Tracking Area Updating (TAU) request; the location-area updating message includes the target RNA information and a target Tracking Area Identity (TAI) list; wherein the target RAI list is a TAI list updated for the UE by the CN entity.

Optionally, the location-area updating request message includes a Radio Resource Control (RRC) message encapsulating the RNA updating request and a RRC message encapsulating the TAU request, the location-area updating message includes a RRC message encapsulating the target RNA information and a RRC message encapsulating the target TAI list.

Optionally, the location-area updating request message includes a Radio Resource Control (RRC) message encapsulating the RNA updating request and a Non-Access Stratum (NAS) message encapsulating the TAU request, the location-area updating message includes a RRC message encapsulating the target RNA information and a NAS message encapsulating the target TAI list.

In a third aspect, a method for updating a location area of a User Equipment (UE) is provided in the embodiments of the present disclosure, and includes: receiving, by a Core Network (CN) entity, a tracking area updating (TAU) request transmitted by an access network entity, wherein the TAU request includes an identifier of the UE; updating a Tracking Area Identity (TAI) list for the UE according to the TAU request by the CN entity, and obtaining a target TAI list; transmitting the target TAI list to the access network entity by the CN entity.

Optionally, the CN entity receives a control-plane message or a user-plane message including the TAU request transmitted by the access network entity; the CN entity transmits a control-plane message or a user-plane message including the target TAI list to the access network entity.

Optionally, the CN entity receives a Non-Access Stratum (NAS) message including the TAU request transmitted by the access network entity; the CN entity transmits a NAS message including the target TAI list to the access network entity.

In a fourth aspect, an access network entity is provided in the present disclosure and includes a reception module, configured for receiving a location-area updating request message transmitted by a User Equipment (UE); and a transmission module, configured for transmitting a location-area updating message to the UE, wherein the location-area updating message at least includes target Radio Access Network (RAN) notification area (RNA) information, the target RNA information is RNA information updated for the UE by the access network entity according to the location-area updating request message.

Optionally, the access network entity further includes a determination module, configured for determining, according to the location-area updating request message, whether a Tracking Area Identity (TAI) list of the UE needs to be updated or not. The transmission module includes a first updating unit and a first transmission unit, the first updating unit is configured for, under a condition that the TAI list of the UE does not need to be updated, updating the RNA information for the UE by the access network entity according to the location-area updating request message, and obtaining the target RNA information, and the first transmission unit is configured for transmitting the location-area updating message including the target RNA information to the UE.

Optionally, the access network entity further includes a determination module, configured for, determining, according to the location-area updating request message, whether a Tracking Area Identity (TAI) list of the UE needs to be updated or not; wherein, the transmission module includes a second transmission unit, a first reception unit, and a third transmission unit, the second transmission unit is configured for, under a condition that the TAI list of the UE needs to be updated, transmitting a Tracking Area Updating (TAU) request to a Core Network (CN) entity according to the location-area updating request message; the first reception unit is configured for receiving the target TAI list transmitted by the CN entity, wherein the target TAI list is updated for the UE by the CN entity according to the TAU request; the third transmission unit is configured for transmitting the location-area updating message including the target RNA information and the target TAI list to the UE.

Optionally, the location-area updating request message includes a RNA updating request, and the determination module includes: an obtaining unit, configured for obtaining information of a target cell in the RNA updating request; a judgement unit, configured for judging whether the TAI list of the UE obtained in advance includes an identifier of the target cell or not; a first determination unit, configured for, under a condition that the TAI list includes the identifier of the target cell, determining that the TAI list of the UE needs not to be updated; and a second determination unit, configured for, under a condition that the TAI list of the UE does not include the identifier of the target cell, determining that the TAI list of the UE needs to be updated.

Optionally, the location-area updating request message including the RNA updating request includes a Radio Resource Control (RRC) message encapsulating the RNA updating request.

Optionally, the location-area updating request message includes a RNA updating request and a Tracking Area Updating (TAU) request, the transmission module includes: a fourth transmission unit, configured for parsing the TAU request from the location-area updating request message and transmitting the TAU request to a Core Network (CN) entity; a second reception unit, configured for receiving a target Tracking Area Identity (TAI) list transmitted by the CN entity, wherein the target TAI list is a TAI list updated for the UE by the CN entity; and a fifth transmission unit, configured for transmitting the location-area updating message including the target RNA information and the target TAI list to the UE.

Optionally, the location-area updating request message includes a Radio Resource Control (RRC) message encapsulating the RNA updating request and a Non-Access Stratum (NAS) message encapsulating the TAU request; the fourth transmission unit is further configured for parsing the NAS message encapsulating the TAU request from the location-area updating request message and transmitting the NAS message to the CN entity; the second reception unit is further configured for receiving the NAS message including the target TAI list transmitted by the CN entity; the fifth transmission unit is further configured for transmitting a RRC message including the target RNA information and a NAS message including the target TAI list to the UE.

Optionally, the location-area updating request message includes a Radio Resource Control (RRC) message encapsulating the RNA updating request and a RRC message encapsulating the TAU request. The fourth transmission unit is further configured for parsing the RRC message encapsulating the TAU request and transmitting a control-plane message or a user-plane message including the TAU request to the CN entity; the second reception unit is further configured for receiving a control-plane message or a user-plane message including the target TAI list transmitted by the CN entity; the fifth transmission unit is further configured for: transmitting a RRC message including the target RNA information and a RRC message including the target TAI list to the UE.

Optionally, the transmission module further includes: a second updating unit, configured for updating RNA information for the UE according to the target TAI list and obtaining the target RNA information, wherein the target TAI list includes all cell identities corresponding to cells in the target RNA information and/or tracking area identities in a TAI list corresponding to the cells in the target RNA information.

In a fifth aspect, a User Equipment (UE) is provided in the present disclosure and includes a transmission module, configured for transmitting a location-area updating request message to an access network entity; and a reception module, configured for receiving a location-area updating message transmitted by the access network entity, wherein the location-area updating message at least includes target Radio Access Network (RAN) notification area (RNA) information, the target RNA information is RNA information updated for the UE by the access network entity according to the location-area updating request message.

Optionally, the location-area updating request message includes a Radio Access Network (RAN) notification area (RNA) updating request; the location-area updating message includes the target RNA information; or the location-area updating message includes the target RNA information and a target Tracking Area Identity (TAI) list, wherein the target RAI list is a TAI list updated for the UE by a Core Network (CN) entity.

Optionally, the UE further includes: an obtaining module, configured for obtaining a current state of the UE; and a transmission module, configured for, under a condition that the UE is in an inactive state, not allowing the UE from transmitting a Tracking Area Updating (TAU) request, but transmitting the location-area updating request message including the RNA updating request to the access network entity.

Optionally, the location-area updating request message includes a Radio Resource Control (RRC) message encapsulating the RNA updating request, the location-area updating message includes a RRC message encapsulating the target RNA information, or the location-area updating message includes the RRC message encapsulating the target RNA information and a RRC message encapsulating the target TAI list.

Optionally, the location-area updating request message includes a RNA updating request and a Tracking Area Updating (TAU) request; the location-area updating message includes the target RNA information and a target Tracking Area Identity (TAI) list; wherein the target RAI list is a TAI list updated for the UE by the CN entity.

Optionally, the location-area updating request message includes a Radio Resource Control (RRC) message encapsulating the RNA updating request and a RRC message encapsulating the TAU request, the location-area updating message includes a RRC message encapsulating the target RNA information and a RRC message encapsulating the target TAI list.

Optionally, the location-area updating request message includes a Radio Resource Control (RRC) message encapsulating the RNA updating request and a Non-Access Stratum (NAS) message encapsulating the TAU request, the location-area updating message includes a RRC message encapsulating the target RNA information and a NAS message encapsulating the target TAI list.

In a sixth aspect, a Core Network (CN) entity is provided in the present disclosure and includes a reception module, configured for receiving a tracking area updating (TAU) request transmitted by an access network entity, wherein the TAU request includes an identifier of a User Equipment (UE); a updating module, configured for updating a Tracking Area Identity (TAI) list for the UE according to the TAU request, and obtaining a target TAI list; and a transmission module, configured for transmitting the target TAI list to the access network entity.

Optionally, the reception module is further configured for receiving a control-plane message or a user-plane message including the TAU request transmitted by the access network entity; the transmission module is further configured for transmitting a control-plane message or a user-plane message including the target TAI list to the access network entity.

Optionally, the reception module is further configured for, receiving a Non-Access Stratum (NAS) message including the TAU request transmitted by the access network entity; the transmission module is further configured for transmitting a NAS message including the target TAI list to the access network entity.

In a seventh aspect, an access network entity is provided in the present disclosure and includes a processor; a transceiver, configured for transmitting and receiving data under a control of the processor; a storage, configured for storing programs and data; and a bus interface, wherein the processor, the transceiver, and the storage communicate with each other through the bus interface, and the processor is configured for reading programs and data stored in the storage and executing the method according to the first aspect.

In an eighth aspect, a User Equipment (UE) is provided in the present disclosure and includes a processor; a transceiver, configured for transmitting and receiving data under a control of the processor; a storage, configured for storing programs and data; and a bus interface, wherein the processor, the transceiver, and the storage communicate with each other through the bus interface, and the processor is configured for reading programs and data stored in the storage and executing the method according to the second aspect.

In a ninth aspect, a Core Network (CN) entity is provided in the present disclosure and includes a processor; a transceiver, configured for transmitting and receiving data under a control of the processor; a storage, configured for storing programs and data; and a bus interface, wherein the processor, the transceiver, and the storage communicate with each other through the bus interface, and the processor is configured for reading programs and data stored in the storage and executing the method according to the third aspect.

In a tenth aspect, a non-volatile storage medium is provided in the present disclosure and includes programs and data stored on the non-volatile storage medium, wherein when the programs and the data are executed by a processor, the processor implements the method according to the first aspect.

In an eleventh aspect, a non-volatile storage medium is provided in the present disclosure and includes programs and data stored on the non-volatile storage medium, wherein when the programs and the data are executed by a processor, the processor implements the method according to the second aspect.

In a twelfth aspect, a non-volatile storage medium is provided in the present disclosure and includes programs and data stored on the non-volatile storage medium, wherein when the programs and the data are executed by a processor, the processor implements the method according to the third aspect.

BRIEF DESCRIPTION OF THE DRAWINGS

In order to more clearly illustrate technical solutions of embodiments of the present disclosure, drawings used in description of the embodiments will be briefly discussed hereinafter. Obviously, following figures are only some of the embodiments of the present disclosure, and one skilled in the art may derive other figures based on these figures without paying any creative labor.

DETAILED DESCRIPTION

To make technical problems to be solved, technical solutions, and advantages of the present disclosure more apparent, specific embodiments will be described hereinafter in details in combination with the drawings.

In a relevant mobile communication system, a User-Equipment (UE) location area is controlled by a Core Network (CN), i.e., a CN level location area. A UE location area controlled by the CN is called a Tracking Area (TA). The CN always configures the UE with a Tracking Area Identity (TAI) list through a Non-Access Stratum (NAS) message. The UE stores the TAI list configured by the CN. Under a condition that the UE camps on a cell (i.e., the UE is in an idle state) or the UE accesses a cell (i.e., the UE is in a connected state), the UE reads a system message broadcast through an air interface of the cell, and obtains the TAI of the cell from the message. If the TAI is in the TAI list stored in the UE, the UE does not need to update the TAI list. If the TAI is not stored in the TAI list stored in the UE, the UE initiates a Tracking Area Update (TAU) procedure, so as to obtain a new TAI list through communicating a NAS signaling with the CN.

Figure 1:
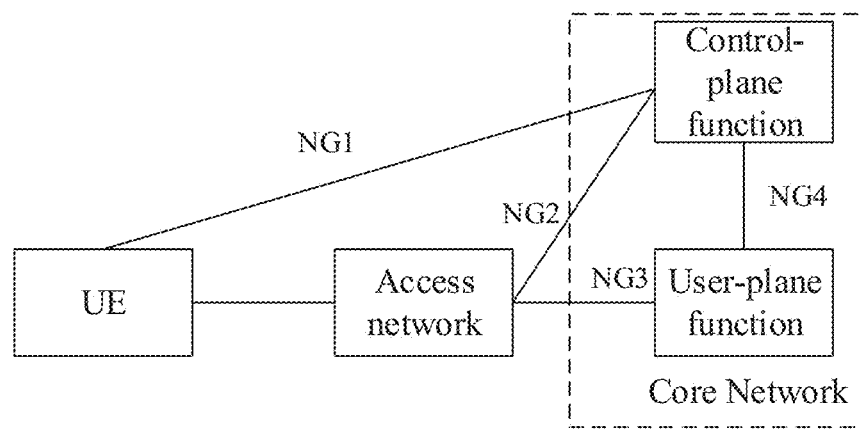
FIG. 1 is a schematic diagram of an application environment in which a method for updating a UE location area provided in some embodiments of the present disclosure is applied.

In a next generation mobile communication system (such as a fifth generation (5G) mobile communication system), a new mobility status may be introduced, such as a Radio Resource Control (RRC) inactive connected state (inactive state, for short). Under a condition that the UE is in the inactive state, although an access network node releases a RRC connection between the access network node and the UE, the UE remain being connected to the CN. Referring to FIG. 1, FIG. 1 is a schematic diagram of an application environment provided in some embodiments of the present disclosure. As shown in FIG. 1, under a condition that the UE is in the active state, the access network node releases the RRC connection between the UE and the access network node, but the access network node remains being connected to the CN, such as NG2 and NG3 shown in FIG. 1. The NG2 represents a connection between control-plane functions of the access network node and the CN, and the NG3 represents a connection between user-plane functions of the access network node and the CN. Under a condition that the UE is in the inactive state, the inactive state of the UE is transparent to the CN, i.e., the CN still deems the UE to be in the connected state. Thus, downlink signalings or data will arrive at the access network node, in which case the access network node needs to page the UE.

Before the inactive state is introduced, the UE may only be in the idle state or in the connected state. A location area of the UE in the idle state is the TA, and a location area of the UE in the connected state is a cell. After the inactive state is introduced, a RAN level location area called RAN Notification Area (RNA) needs to be introduced to the UE. The RNA may include a plurality of cells. The access network node may broadcast a notification message in the plurality of cells in the RNA so as to page the UE. Under a condition that the UE moves out of the RNA, the RNA needs to be updated so that the access network node may find the UE.

The TA and the RNA are location areas which a CN node and an access network node maintain for the UE, respectively. Functions of the TA and the RNA are to enable the CN node and the access network node to track location areas of the UE, respectively. Under a condition that the UE is in the idle state, the CN searches the UE by transmitting a paging message in all cells within a TAI list for the UE. Under a condition that the UE is in the non-active state, the access network node searches the UE by transmitting the notification message in all cells within the RNA.

Based on the above concepts and the schematic diagram of the application environment shown in FIG. 1, the present disclosure provides a method for updating a location area of a UE. The method for updating a location area of a UE will be described in details hereinafter in combination with specific embodiments of the present disclosure. It should be noted that, the schematic diagram shown in FIG. 1 is only exemplary schematic diagram. The embodiments of the present disclosure are not limited to be applied in the application environment shown in FIG. 1. The UE in the present disclosure may be a terminal such as a cellular phone, a computer, household electrical appliances, a Tablet Personal Computer, a Laptop Computer, a Personal Digital Assistance (PDA), a Mobile Internet Device (MID) or a Wearable Device. It is noted that the UE is not limited to a specific type of user equipment in the present disclosure.

Figure 2:
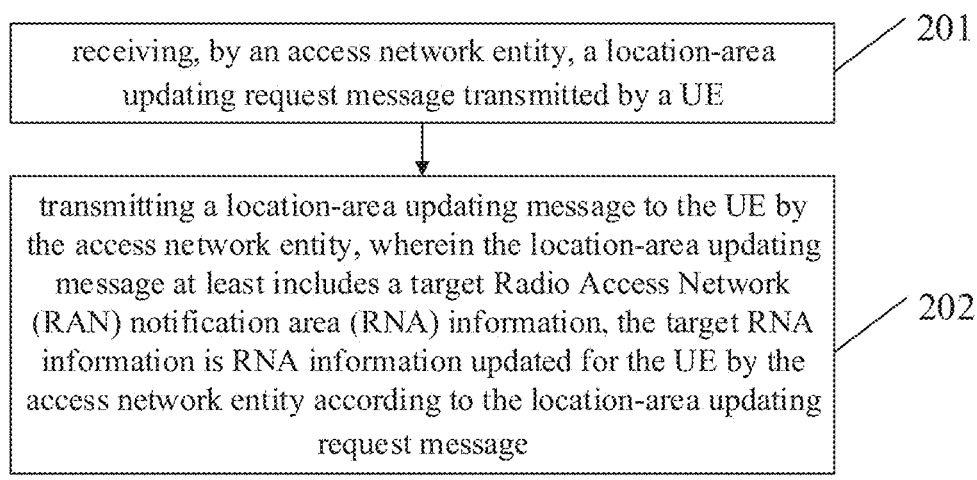
FIG. 2 is a flowchart of the method for updating a UE location area provided in some embodiments of the present disclosure.

Referring to FIG. 2, FIG. 2 is a schematic diagram of an example of the method for updating a UE location area provided in some embodiments of the present disclosure. As shown in FIG. 2, the method includes steps 201-202.

Step 201: receiving, by an access network entity, a location-area updating request message transmitted by a UE.

Step 202: transmitting a location-area updating message to the UE by the access network entity, wherein the location-area updating message at least includes a target Radio Access Network (RAN) notification area (RNA) information, the target RNA information is RNA information updated for the UE by the access network entity according to the location-area updating request message.

In the embodiments of the present disclosure, the access network entity receives the location-area updating request message transmitted by the UE. The location-area updating request message may be a message carrying a RNA updating request or a message carrying the RNA updating request and a Tracking Area Updating (TAU) request. The UE may directly transmit the message carrying the RNA updating request to the access network entity. The UE may also directly transmit the message carrying the RNA updating request and the TAU request to the access network entity. In some embodiments of the present disclosure, the UE may also acquire a current state of the UE, and then transmits the location-area updating request message to the access network entity according to the current state of the UE. As an example, under a condition that the UE is in the in-active state, the UE is prohibited from transmitting the TAU request. That is, under a condition that the UE is currently in the inactive state, the UE transmits the location-area updating request message carrying the RNA updating request to the access network entity.

After the access network entity receives the location-area updating request message transmitted by the UE, the access network entity may transmit the location-area updating message to the UE. The location-area updating message may be a message only carrying target RNA information, or may be a message carrying the target RNA information and a target TAI list, wherein the target RNA information is RNA information updated for the UE by the access network entity, and the TAI list is a TAI list updated for the UE by the CN entity.

Under a condition that the location-area updating request message transmitted by the UE is a message carrying the RNA updating request, the access network entity may further determine, according to the RNA updating request, whether the TAI list of the UE needs to be updated or not. If the access network entity determines that the TAI list of the UE does not need to be updated, the access network entity may update the RNA information for the UE according to the RNA request, and obtain the target RNA information. The access network entity transmits the location-area updating message carrying the target RNA information to the UE. Otherwise, if the access network entity determines that the TAI list of the UE needs to be updated, the access network entity may request, according to the location-area updating request message, the CN entity to update the TAI list of the UE. That is, the access network entity transmits a TAU request to the CN entity and the CN entity may update the TAI list of the UE according to the TAU request after the CN entity received the TAU request, and the target TAI list is obtained by the CN entity and transmitted to the access network entity; the access network entity may also update the RNA information for the UE according to the RNA updating request, the target RNA information is received, and the access network entity transmits the location-area updating message carrying the target TAI list and the target RNA information to the UE.

If the location-area updating request message transmitted by the UE is a message carrying the RNA updating request and the TAU request, the access network entity may transmit the location-area updating message carrying the target RNA information and the target TAI list to the UE. Specifically, the access network entity may extract the TAU request from the location-area updating request message, and transmit the TAU request to the CN entity; and the CN entity may update the TAI list for the UE according to the TAU request after the CN entity received the TAU request, and the target TAI list is received by the CN entity; the access network entity may also update the RNA information for the UE according to the RNA updating request, the target RNA information is received, and the access network entity may transmit the location-area updating message carrying the target TAI list and the target RNA information to the UE. It may be understood that, when the access network entity transmits the TAU request to the CN network, the access network entity may carry an identifier code of the UE in the TAU request and thereby the CN entity may determine the UE according to the identifier code of the UE and update the TAI list for the UE.

Under a condition that the UE transmits, to the access network entity, the location-area updating request message carrying the RNA updating request and the TAU request, the TAU request may be carried in a Non-Access Stratum (NAS) message. The UE transmits a RRC message including the RNA updating request piggybacked with the NAS message including the TAU request to the access network entity. That is, the UE may transmit a data packet to the access network entity, wherein the data packet includes the RRC message including the RNA updating request and the NAS message including the TAU request. The UE may also encapsulate TAU request into the RRC message and transmit the RRC message including the RNA updating request in tandem with the TAU request to the access network entity.

It should be noted that, under a condition that the access network entity transmits the location-area updating message including the target RNA information and the target TAI list to the UE, the access network entity may update the RNA for the UE according to the RNA updating request before the access network entity transmits the TAU request to the CN entity, and may also update the RNA for the UE according to the RNA updating request after the access network entity transmits the TAU request to the CN entity. The access network entity may also update the RNA for the UE according to the RNA updating request at the time of transmitting the TAU request to the CN entity. In some embodiments of the present disclosure, the access network entity may also update the RNA for the UE according to the RNA updating request after the access network entity receives the target TAI list transmitted by the CN entity, or update the TAI list for the UE according to the RNA updating request and the target TAI list, which is not limited in the embodiments of the present disclosure.

Optionally, the method further includes: according to the location-area updating request message, determining by the access network entity whether the TAI list of the UE needs to be updated or not.

Specifically, transmitting the location-area updating message to the UE by the access network entity, includes: if the TAI list of the UE needs not to be updated, updating the RNA information for the UE by the access network entity according to the location-area updating request message and obtaining the target RNA information; and transmitting the location-area updating message including the target RNA information to the UE by the access network entity.

In the embodiment, the access network entity determines, according to the location-area updating request message, whether the TAI list of the UE needs to the updated or not. If the TAI list of the UE needs not to be updated, the access network entity updates the RNA of the UE according to the RNA updating request and obtains the target RNA information, and transmits the location-area updating message including the target RNA information to the UE.

In the embodiment, the access network entity may store the TAI list of the UE in advance, and then determines, according to the RNA updating request and the TAI list stored in advance, whether the TAI list of the UE needs to be updated or not. In some embodiment of the present disclosure, the UE may also carry the TAI list of the UE in the location-area updating request message, and the access network entity determines, according to the RNA updating request and the TAI list of the UE included in the location-area updating request message, whether the TAI list of the UE needs to the updated or not.

Optionally, the method further includes: according to the location-area updating request message, determining by the access network entity whether the TAI list of the UE needs to be updated or not.

Transmitting the location-area updating message to the UE by the access network entity, includes: if the TAI list of the UE needs to be updated, transmitting the TAU request to the CN entity according to the location-area updating request message by the access network entity; and receiving the target TAI list transmitted by the CN entity by the access network entity, wherein the target TAI list is a TAI list updated for the UE by the CN entity according to the TAU request; and transmitting the location-area updating message including the target RNA information and the target TAI list to the UE by the access network entity.

In the embodiment, the access network entity determines, according to the location-area updating request message, whether the TAI list of the UE needs to the updated or not. If the TAI list of the UE needs to be updated, the access network entity transmits the TAU request to the CN entity according to the location-area updating request message, and transmits to the UE the location-area updating message including the target RNA information and the target TAI list updated for the UE by the CN entity, after the access network entity receives the target TAI list.

Figure 3:
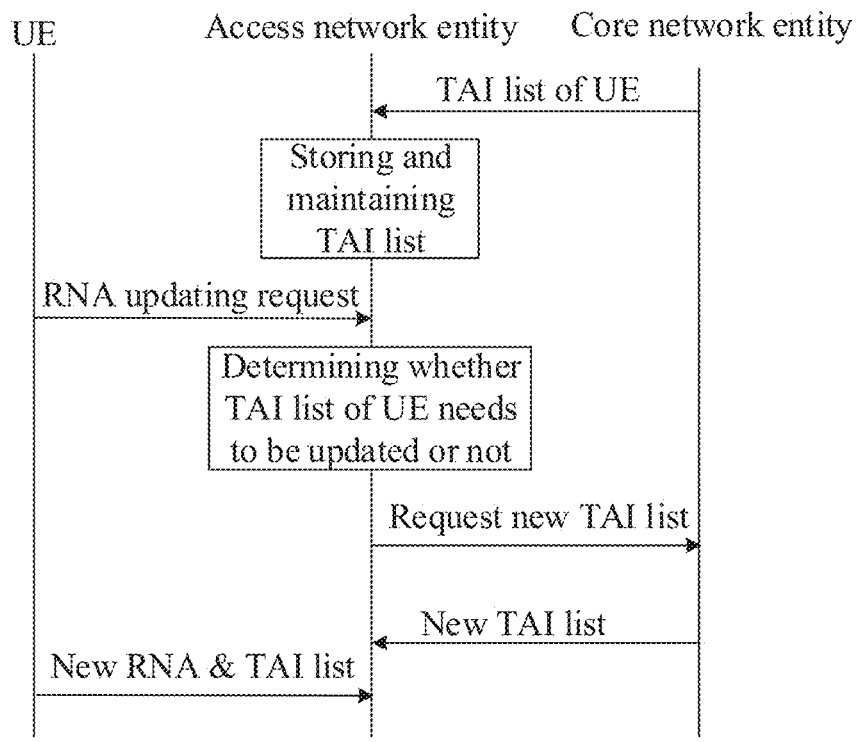
FIG. 3 is a schematic diagram of an example of the method for updating a UE location area provided in some embodiments of the present disclosure.

Referring to FIG. 3, FIG. 3 is a schematic diagram of an example of a method for updating a location area of a UE provided in some embodiments of the present disclosure. As shown in FIG. 3, the CN entity transmits the TAI list of the UE to the access network entity. The access network entity stores and maintains the TAI list of the UE. The UE transmits the RNA updating request to the access network entity. The access network entity determines, according to the RNA updating request and the TAI list, whether the TAI list of the UE needs to be updated or not. If the TAI list of the UE needs to be updated, the access network entity transmits to the CN entity a request for a updated TAI list. The CN entity transmits the updated TAI list to the access network entity according to the request. The access network entity transmits a updated RNA and the updated TAI list to the UE. Through the above steps, the RNA and the location area TA of the UE are updated.

Optionally, the location-area updating request includes the RNA updating request. Determining, by the access network entity according to the location-area updating request message, whether the TAI list of the UE needs to be updated or not, includes: obtaining information of a target cell in the RNA updating request by the access network entity; and determining by the access network entity whether the TAI list of the UE obtained in advance includes an identifier of the target cell or not, if the TAI list includes the identifier of the target cell, determining, by the access network entity, the TAI list of the UE needs not to be updated; and if the TAI list of the UE does not include the identifier of the target cell, determining, by the access network entity, the TAI list of the UE needs to be updated.

In the embodiment, the location-area updating request message includes the RNA updating request. The access network entity obtains information of the target cell in the RNA updating request; and determines whether the TAI list of the UE needs to be updated or not, by determining whether the TAI list of the UE includes the identifier of the target cell. Specifically, the RNA updating request includes information of the target cell in which the UE currently is located. The access network entity obtains the information of the target cell in the RNA updating request, and then determines whether the TAI list of the UE includes the identifier of the target cell, if the TAI list of the UE includes the identifier of the target cell, the access network entity determines that the TAI list of the UE needs not to be updated; otherwise, if the TAI list of the UE does not include the identifier of the target cell, the access network entity determines that the TAI list of the UE needs to be updated.

The TAI list of the UE may be transmitted to the access network entity by the CN entity and the access network entity stores the TAI list of the UE in advance. The TAI list of the UE may also be included in the location-area updating request message. The access network entity obtains the TAI list of the UE from the location-area updating request message received by the access network entity.

Optionally, the location-area updating request message including the RNA updating request may be the RRC message including the RNA updating request.

In the embodiment, when the UE transmits the location-area updating request message including the RNA updating request to the access network entity, the UE transmits the RRC message including the RNA updating request to the access network entity. The access network entity parses the RRC message and obtains the RNA updating request. Thereafter, the access network entity determines, according to the RNA updating request, whether the TAI list of the UE needs to be updated or not. If the TAI list of the UE needs to be updated, the access network entity transmits a control-plane message (such as through the NG2 shown in FIG. 1) or a user-plane message (such as through the NG3 shown in FIG. 1) including the TAU request to the CN entity. The CN entity updates the TAI list of the UE according to the TAU request, and obtains the target TAI list. The CN entity transmits a control-plane message or a user-plane message including the target TAI list to the access network entity. The access network entity receives the target TAI list and then transmits the RRC message including the target TAI list and the RRC message including the target RNA information.

Optionally, the location-area updating request message includes the RNA updating request and the TAU request, the method further includes: parsing the TAU request from the location-area updating request message and transmitting the TAU request to the CN entity by the access network entity, receiving the target TAI list transmitted by the CN entity by the access network entity, wherein the target TAI list is the TAI list updated for the UE by the CN entity.

Transmitting the location-area updating message to the UE by the access network entity, includes: transmitting, by the access network entity, the location-area updating message including the target RNA information and the target TAI list to the UE.

Figure 4:
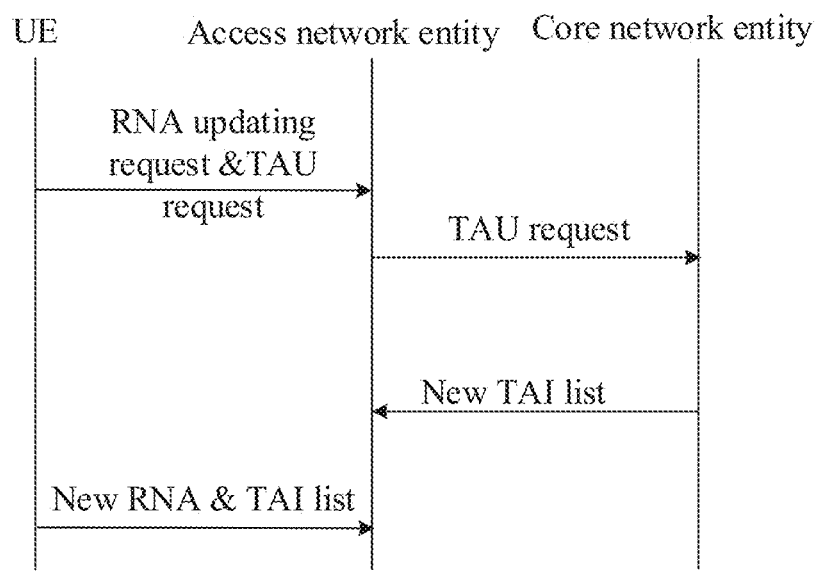
FIG. 4 is a schematic diagram of another example of the method for updating a UE location area provided in some embodiments of the present disclosure.

Referring to FIG. 4, FIG. 4 is a schematic diagram of another example of the method for updating a location area of the UE provided in the embodiments of the present disclosure. As shown in FIG. 4, in the embodiment, a location-area updating request message transmitted by the UE to the access network entity includes both the RNA and the TAU request. The access network entity parses the TAU request from the location-area updating request message and transmits the TAU request to the CN entity. The CN entity updates the TAI list for the UE according to the TAU request and obtains the target TAI list. The CN entity transmits the target TAI list to the access network entity, and the access network entity receives the target TAI list and transmits the location-area updating message including the target TAI list and the target RNA information to the UE.

Optionally, the location-area updating request message encapsulates the RRC message including the RNA updating request and the non-access stratum (NAS) message including the TAU request.

Parsing the TAU request from the location-area updating request message by the access network entity and transmitting the TAU request to the CN entity, includes: parsing the NAS message including the TAU request from the location-area updating request message by the access network entity, and transmitting the NAS message to the CN entity by the access network entity.

Receiving the target TAI list transmitted by the CN entity by the access network entity, includes: receiving the NAS message including the target TAI list transmitted by the CN entity by the access network entity.

Transmitting the location-area updating message including the target RNA information and the target TAI list to the UE by the access network entity, includes: transmitting, by the access network entity, the RRC message including the target RNA information and the NAS message including the target TAI list to the UE.

In the embodiment, the location-area updating request message transmitted by the UE encapsulates the RRC message including the RNA updating request and the NAS message including the TAU request. The access network entity parses the NAS including the TAU request from the location-area updating request message and transmits the NAS message to the CN entity. The CN entity updates the TAI list of the UE according to the NAS message including the TAU request and obtains the target TAI list. The CN entity transmits the NAS message including the target TAI list to the access network entity. The access network entity receives the NAS message including the target TAI list and transmits the NAS message together with the RRC message including the target RNA information to the UE. The UE parses the RRC message including the target RNA information at an access layer and obtains the target RNA information, and parse the NAS message including the TAI list at a non-access layer and obtains the target TAI list.

Optionally, the location-area updating request message encapsulates the RRC message including the RNA updating request and the RRC message including the TAU request.

Parsing the TAU request from the location-area updating request message by the access network entity and transmitting the TAU request to the CN entity, includes: parsing the RRC message including the TAU request by the access network entity and transmitting the control-plane message or the user-plane message including the TAU request to the CN entity by the access network entity.

Receiving the target TAI list transmitted by the CN entity by the access network entity, includes: receiving the control-plane message or the user-plane message including the target TAI list transmitted by the CN entity by the access network entity.

Transmitting the location-area updating message including the target RNA information and the target TAI list to the UE by the access network entity, includes: transmitting, by the access network entity, the RRC message including the target RNA information and the RRC message including the target TAI list to the UE.

In the embodiment, the location-area updating request message transmitted by the UE encapsulates the RRC message including the RNA updating request and the RRC message including the TAU request. The access network entity parses the RRC message including the TAU request, and obtains the TAU request, and transmits the control-plane message or the user-plane message including the TAU request to the CN entity. The CN entity receives the TAU request and updates the TAI list for the UE and obtains the target TAI list. The CN entity transmits the control-plane message or the user-plane message including the target TAI list to the access network entity. The access network entity receives the control-plane message or the user-plane message including the target TAI list, obtains the target TAI list and transmits the RRC message including the target TAI list and the RRC message including the target RNA information to the UE.

Optionally, the method further includes: updating RNA information for the UE by the access network entity according to the target TAI list and obtaining the target RNA information, wherein the target TAI list includes all cell identities corresponding to cells in the target RNA information and/or tracking area identities in a TAI list corresponding to the cells in the target RNA information.

In the embodiment, the method updates the RNA information for the UE only after the target TAI list transmitted by the CN entity is received. Specifically, the access network entity updates the RNA information for the UE according to the target TAI list and the RNA updating request, and obtains the target RNA information. In the embodiment, when the access network entity updates the RNA information for the UE, the target TAI list includes all cell identities corresponding to cells in the target RNA information and/or tracking area identities in a TAI list corresponding to the cells in the target RNA information. That is, in the embodiment, the access network entity updates the RNA information for the UE according to the target TAI so that a TA of the UE and a RNA of the UE include same cells, or a boundary of the TA of the UE is aligned with a boundary of the RNA, and the TA of the UE includes all cells in the RNA of the UE or the RNA of the UE includes all cells in the TA of the UE. In this way, in the embodiment, the TA of the UE is kept to be updated with updating the RNA, or the RNA of the UE is updated with updating the TA, and the method for updating a location area of the UE provided in the present disclosure may manage uniformly the TA and the RNA of the UE.

In the embodiment of the present disclosure, the access network entity receives the location-area updating request message transmitted by the UE; the access network entity transmits the location-area updating message to the UE, wherein the location-area updating message at least includes target Radio Access Network (RAN) notification area (RNA) information, the target RNA information is related to a RNA updated for the UE by the access network entity according to the location-area updating request message. In this way, the method for updating the location area of the UE may update the TAU and the RNA coordinately, and may reduce signaling overheads and facilitate efficient management of location information of the UE.

Figure 5:
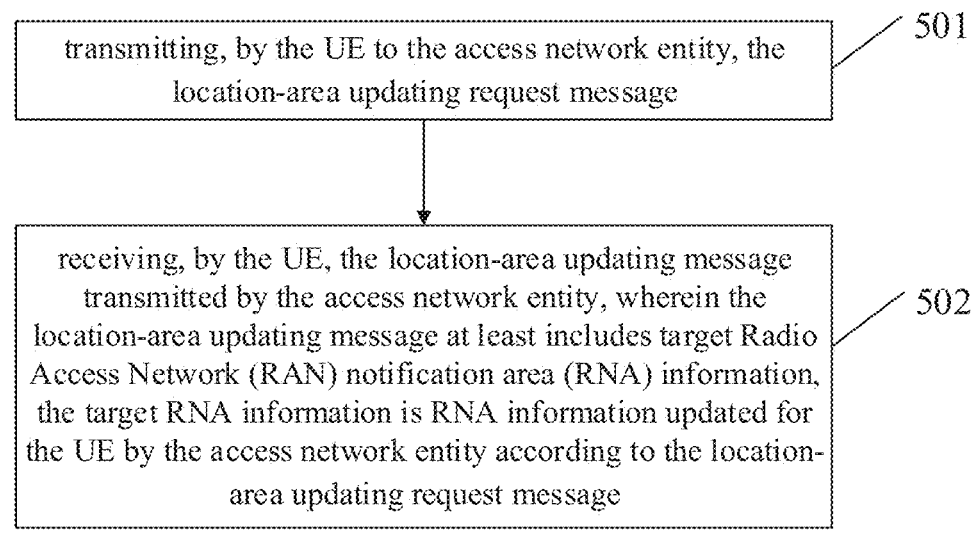
FIG. 5 is another flowchart of the method for updating a UE location area provided in some embodiments of the present disclosure.

Referring to FIG. 5, FIG. 5 is a schematic diagram of another example of the method for updating a location area of the UE provided in some embodiments of the present disclosure. As shown in FIG. 5, the method includes steps 501-502.

Step 501: transmitting, by the UE to the access network entity, the location-area updating request message.

Step 502: receiving, by the UE, the location-area updating message transmitted by the access network entity, wherein the location-area updating message at least includes target Radio Access Network (RAN) notification area (RNA) information, the target RNA information is RNA information updated for the UE by the access network entity according to the location-area updating request message.

Optionally, the location-area updating request message includes the Radio Access Network (RAN) notification area (RNA) updating request; the location-area updating message includes the target RNA information; or the location-area updating message includes the target RNA information and the target TAI list, wherein the target RAI list is the TAI list updated for the UE by the CN entity.

Optionally, the method further includes: obtaining a current state of the UE by the UE; under a condition that the UE is in the in-active state, not transmitting the tracking area updating (TAU) request by the UE, but transmitting the location-area updating request message including the RNA updating request to the access network entity.

Optionally, the location-area updating request message includes the Radio Resource Control (RRC) message encapsulating the RNA updating request, the location-area updating message includes the RRC message encapsulating the target RNA information, or the location-area updating message includes the RRC message encapsulating the target RNA information and the RRC message encapsulating the target TAI list.

Optionally, the location-area updating request message includes the RNA updating request and the tracking area updating (TAU) request; the location-area updating message includes the target RNA information and the target TAI list; wherein the target RAI list is the TAI list updated for the UE by the CN entity.

Optionally, the location-area updating request message includes the Radio Resource Control (RRC) message encapsulating the RNA updating request and the RRC message encapsulating the TAU request, the location-area updating message includes the RRC message encapsulating the target RNA information and the RRC message encapsulating the target TAI list.

Optionally, the location-area updating request message includes the Radio Resource Control (RRC) message encapsulating the RNA updating request and the NAS message encapsulating the TAU request, the location-area updating message includes the RRC message encapsulating the target RNA information and the NAS message encapsulating the target TAI list.

It should be noted that, the embodiment may be an embodiment for a UE side corresponding to the embodiment shown in FIG. 2. Relevant steps performed by the UE may be obtained by referring to relevant descriptions of the embodiment shown in FIG. 2, and will not be repeated herein.

Figure 6:
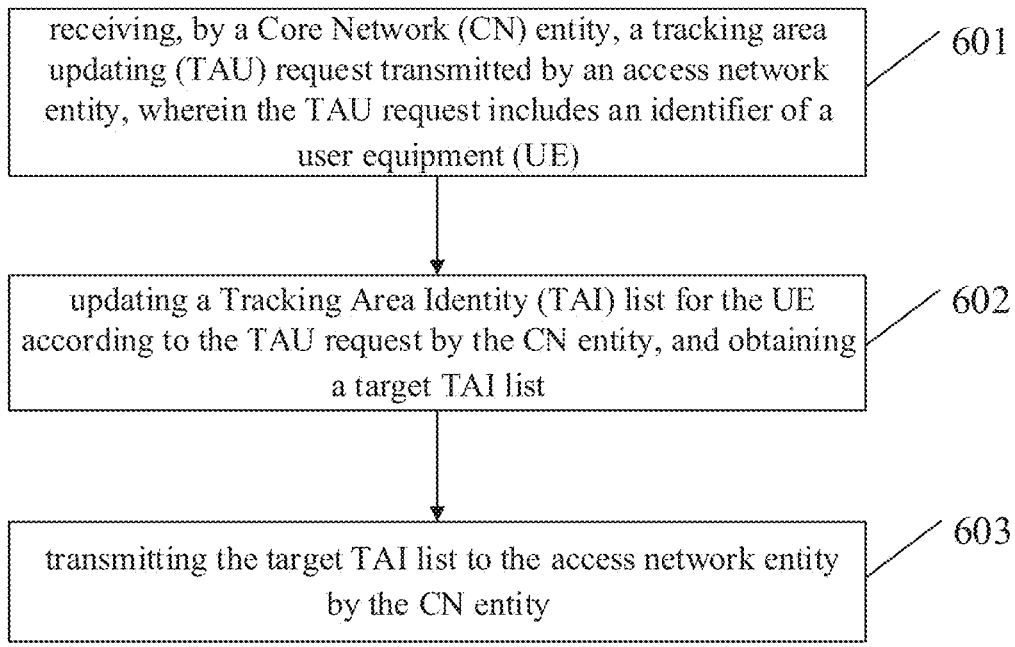
FIG. 6 is still another flowchart of the method for updating a UE location area provided in some embodiments of the present disclosure.

Referring to FIG. 6, FIG. 6 is a schematic diagram of another example of the method for updating a location area of the UE provided in some embodiments of the present disclosure. As shown in FIG. 6, the method includes steps 601-603.

Step 601: receiving, by a Core Network (CN) entity, a tracking area updating (TAU) request transmitted by an access network entity, wherein the TAU request includes an identifier of a user equipment (UE).

Step 602: updating a Tracking Area Identity (TAI) list for the UE according to the TAU request by the CN entity, and obtaining a target TAI list.

Step 603: transmitting the target TAI list to the access network entity by the CN entity.

Optionally, the CN entity receives the control-plane message or the user-plane message including the TAU request transmitted by the access network entity.

The CN entity transmits a control-plane message or a user-plane message including the target TAI list to the access network entity.

Optionally, the CN entity receives a NAS message including the TAU request transmitted by the access network entity. The CN entity transmits a NAS message including the target TAI list to the access network entity.

It should be noted that, the embodiment may be an embodiment for a CN entity side corresponding to the embodiment shown in FIG. 2. Relevant steps performed by the CN entity may be obtained by referring to relevant descriptions of the embodiment shown in FIG. 2, and will not be repeated herein.

Figure 7:
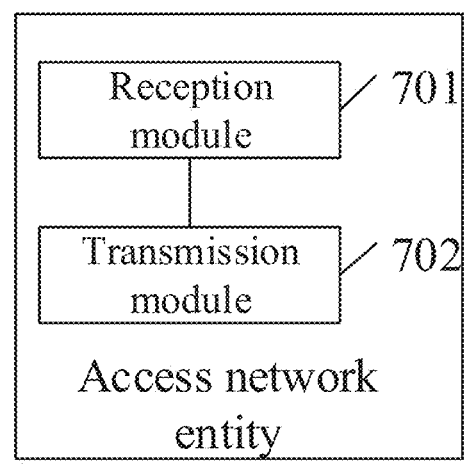
FIG. 7 is a structural schematic diagram of an access network entity provided in some embodiments of the present disclosure.

Referring to FIG. 7, FIG. 7 is a structural diagram of an access network entity provided in the embodiments of the present disclosure. As shown in FIG. 7, the access network entity includes a reception module 701 and a transmission module 702.

The reception module 701 is configured for receiving a location-area updating request message transmitted by a UE. The transmission module 702 is configured for transmitting a location-area updating message to the UE, wherein the location-area updating message at least includes target Radio Access Network (RAN) notification area (RNA) information, the target RNA information is RNA information updated for the UE by the access network entity according to the location-area updating request message.

Figure 8:
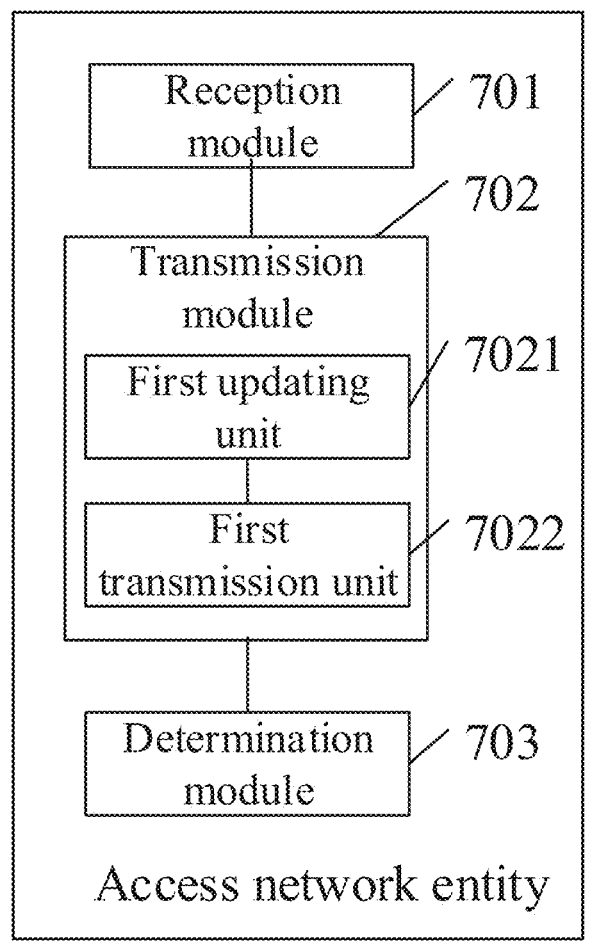
FIG. 8 is a structural schematic diagram of another access network entity provided in some embodiments of the present disclosure.

Optionally, referring to FIG. 8, FIG. 8 is another structural diagram of the access network entity provided in the embodiments of the present disclosure. As shown in FIG. 8, the access network entity further includes a determination module 703. The determination module 703 is configured for determining, according to the location-area updating request message, whether the Tracking Area Identity (TAI) list of the UE needs to be updated or not. The transmission module 702 includes a first updating unit 7021 and a first transmission unit 7022. The first updating unit 7021 is configured for, if the TAI list of the UE does not need to be updated, updating the RNA information for the UE according to the location-area updating request message, and obtaining the target RNA information. The first transmission unit 7022 is configured for transmitting the location-area updating message including the target RNA information to the UE.

Figure 9:
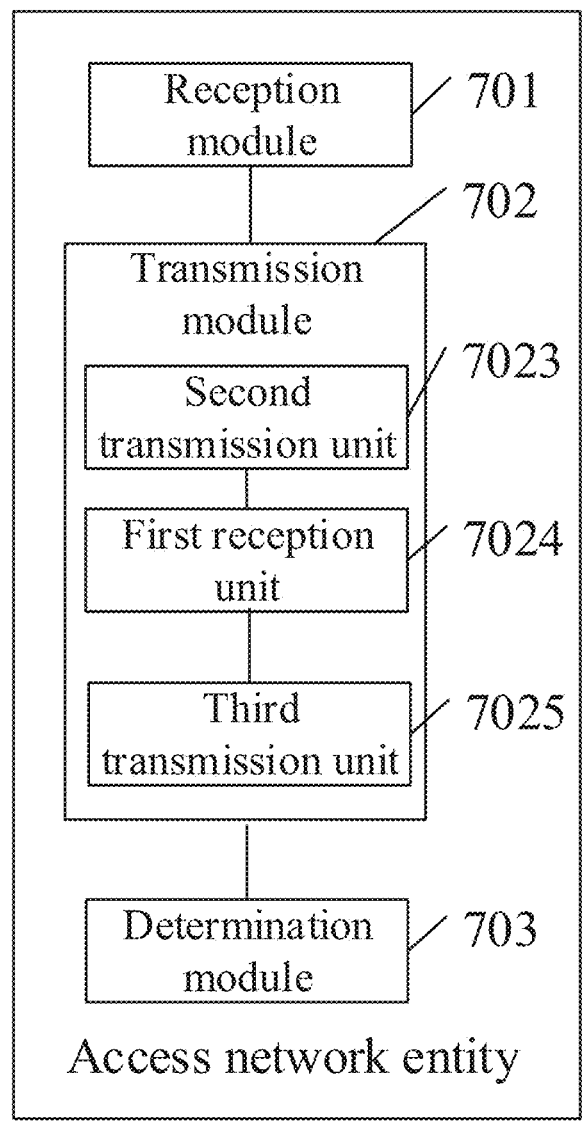
FIG. 9 is a structural schematic diagram of another access network entity provided in some embodiments of the present disclosure.

Optionally, referring to FIG. 9, FIG. 9 is another structural schematic diagram of the access network entity provided in some embodiments of the present disclosure. As shown in FIG. 9, the access network entity further includes a determination module 703. The determination module 703 is configured for, according to the location-area updating request message, determining whether the Tracking Area Identity (TAI) list of the UE needs to be updated or not. The transmission module 702 includes a second transmission unit 7023, a first reception unit 7024, and a third transmission unit 7025. The second transmission unit 7023 is configured for, if the TAI list of the UE needs to be updated, transmitting the Tracking Area Updating (TAU) request to the CN entity according to the location-area updating request message. The first reception unit 7024 is configured for receiving the target TAI list transmitted by the CN entity, wherein the target TAI list is a TAI list updated for the UE by the CN entity according to the TAU request. The third transmission unit 7025 is configured for transmitting the location-area updating message including the target RNA information and the target TAI list to the UE.

Figure 10:
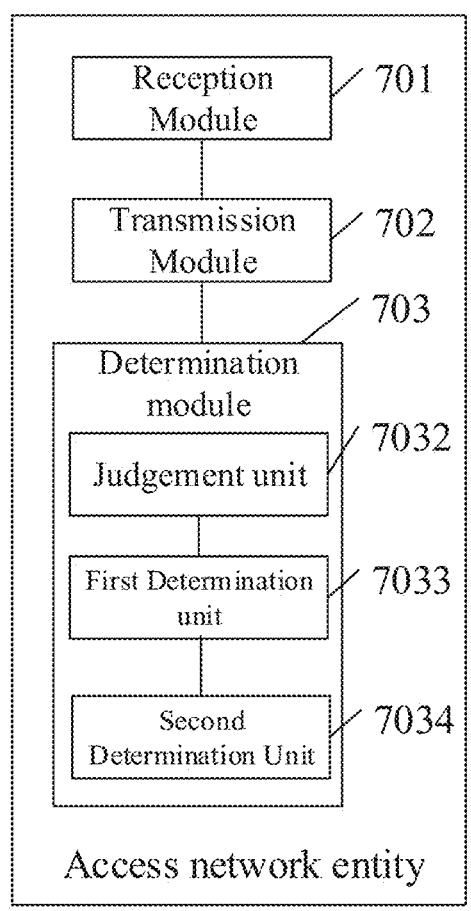
FIG. 10 is a structural schematic diagram of another access network entity provided in some embodiments of the present disclosure.

Optionally, referring to FIG. 10, FIG. 10 is another structural schematic diagram of the access network entity provided in some embodiments of the present disclosure. As shown in FIG. 10, the location-area updating request message includes the RNA updating request. The determination module 703 includes an obtaining module 7031, configured for obtaining information of a target cell in the RNA updating request; a judgement unit 7032, configured for judging whether the TAI list of the UE obtained in advance includes the identifier of the target cell or not; a first determination unit 7033, configured for, if the TAI list includes the identifier of the target cell, determining that the TAI list of the UE does not need to be updated; a second determination unit 7034, configured for, if the TAI list does not include the identifier of the target cell, determining that the TAI list of the UE needs to be updated.

Optionally, the location-area updating request message including the RNA updating request may encapsulate a RRC message including the RNA updating request.

Figure 11:
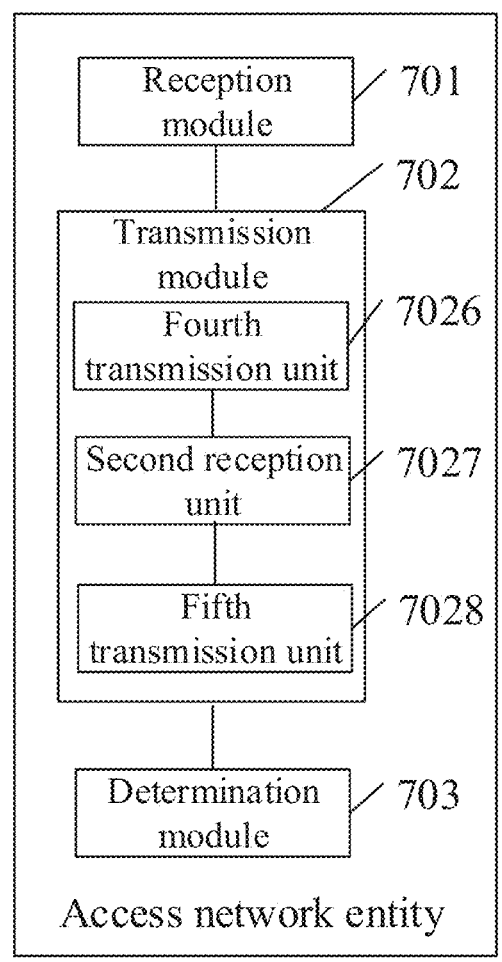
FIG. 11 is a structural schematic diagram of another access network entity provided in some embodiments of the present disclosure.

Optionally, referring to FIG. 11, FIG. 11 is another structural schematic diagram of the access network entity provided in some embodiments of the present disclosure. As shown in FIG. 11, the location-area updating request message includes the RNA updating request and the tracking area updating (TAU) request. The transmission module 702 includes a fourth transmission unit 7026, a second reception unit 7027, and a fifth transmission unit 7028. The fourth transmission unit 7026 is configured for parsing the TAU request from the location-area updating request message and transmitting the TAU request to the CN entity. The second reception unit 7027 is configured for receiving the target TAI list transmitted by the CN entity, wherein the target TAI list is a TAI list updated for the UE by the CN entity. The fifth transmission unit 7028 is configured for transmitting the location-area updating message including the target RNA information and the target TAI list to the UE.

Optionally, the location-area updating request message encapsulates the RRC message including the RNA updating request and the non-access stratum (NAS) message including the TAU request. The fourth transmission unit 7026 is further configured for parsing the NAS message including the TAU request from the location-area updating request message and transmitting the NAS message to the CN entity. The second reception unit 7027 is further configured for receiving the NAS message including the target TAI list transmitted by the CN entity. The fifth transmission unit 7028 is further configured for transmitting a RRC message including the target RNA information and the NAS message including the target TAI list to the UE.

Optionally, the location-area updating request message encapsulates a RRC message including the RNA updating request and a RRC message including the TAU request. The fourth transmission unit 7026 is further configured for parsing the RRC message including the TAU request and transmitting a control-plane message or a user-plane message including the TAU request to the CN entity. The second reception unit 7027 is further configured for receiving the control-plane message or the user plane message including the target TAI list transmitted by the CN entity. The fifth transmission unit 7028 is further configured for transmitting the RRC message including the target RNA information and the RRC message including the target TAI list to the UE.

Figure 12:
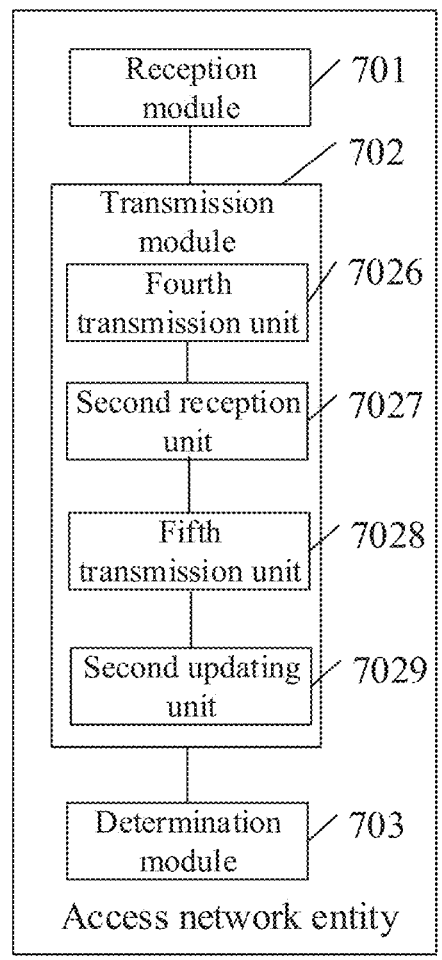
FIG. 12 is a structural schematic diagram of another access network entity provided in some embodiments of the present disclosure.

Optionally, referring to FIG. 12, FIG. 12 is another structural schematic diagram of the access network entity provided in some embodiments of the present disclosure. As shown in FIG. 12, the transmission module 702 further includes a second updating unit 7029, configured for updating the RNA information for the UE according to the target TAI list and obtaining the target RNA information, wherein the target TAI list includes all cell identities corresponding to cells in the target RNA information and/or tracking area identities in a TAI list corresponding to the cells in the target RNA information.

It should be noted that, the access network entity in the embodiment may be the access network entity in the embodiments shown in FIG. 1 to FIG. 6. Operations of the access network entity in the embodiments shown in FIG. 1 to FIG. 6 may be implemented by the access network entity in the embodiment, and same technical effects may be achieved and repeated description is not provided herein.

Figure 13:
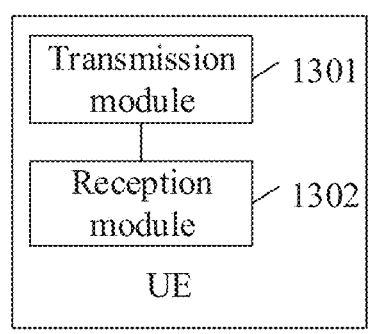
FIG. 13 is a structural schematic diagram of a UE provided in some embodiments of the present disclosure.

Referring to FIG. 13, FIG. 13 is a structural schematic diagram of a UE provided in some embodiments of the present disclosure. As shown in FIG. 13, the UE includes: a transmission module 1301, configured for transmitting the location-area updating request message to the access network entity; and a reception module 1302, configured for receiving a location-area updating message transmitted by the access network entity, wherein the location-area updating message at least includes target Radio Access Network (RAN) notification area (RNA) information, the target RNA information is RNA information updated for the UE by the access network entity according to the location-area updating request message.

Optionally, the location-area updating request message includes a RAN notification area (RNA) updating request. The location-area updating message includes the target RNA information; or the location-area updating message includes the target RNA information and the target TAI list; wherein the target RAI list is the TAI list updated for the UE by the CN entity.

Figure 14:
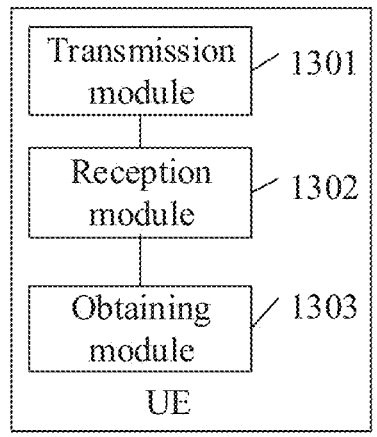
FIG. 14 is another structural schematic diagram of the UE provided in some embodiments of the present disclosure.

Optionally, referring to FIG. 14, FIG. 14 is another structural schematic diagram of the UE provided in some embodiments of the present disclosure. As shown in FIG. 14, the UE further includes an obtaining module 1303, configured for obtaining a current state of the UE, wherein the transmission module 1301 is further configured for, under a condition that the UE is in the inactive state, not transmitting the tracking area updating (TAU) request, but transmitting the location-area updating request message including the RNA updating request to the access network entity.

Optionally, the location-area updating request message includes the Radio Resource Control (RRC) message encapsulating the RNA updating request, the location-area updating message includes the RRC message encapsulating the target RNA information, or the location-area updating message includes the RRC message encapsulating the target RNA information and the RRC message encapsulating the target TAI list.

Optionally, the location-area updating request message includes the RNA updating request and the target-area updating (TAU) request. The location-area updating message includes the target RNA information and the target TAI list; wherein the target RAI list is the TA list updated for the UE by the CN entity.

Optionally, the location-area updating request message includes the Radio Resource Control (RRC) message encapsulating the RNA updating request and the RRC message encapsulating the TAU request, and the location-area updating message includes the RRC message encapsulating the target RNA information and the RRC message encapsulating the target TAI list.

Optionally, the location-area updating request message includes the Radio Resource Control (RRC) message encapsulating the RNA updating request and the NAS message encapsulating the TAU request, the location-area updating message includes the RRC message encapsulating the target RNA information and the NAS message encapsulating the target TAI list.

It should be noted that, the UE in the embodiment may be the UE in the embodiments shown in FIG. 1 to FIG. 6. Operations of the UE in the embodiments shown in FIG. 1 to FIG. 6 may be implemented by the UE in the embodiment, and same technical effects may be achieved and repeated description is not provided herein.

Figure 15:
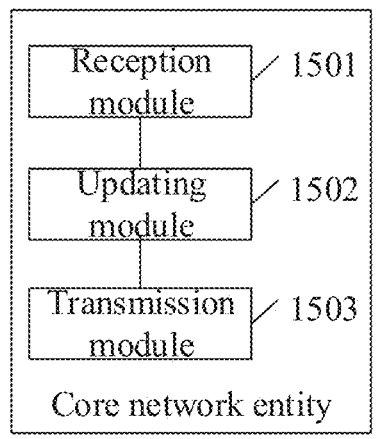
FIG. 15 is a structural schematic diagram of a core network entity provided in some embodiments of the present disclosure.

Referring to FIG. 15, FIG. 15 is a structural schematic diagram of a Core Network (CN) entity provided in some embodiments of the present disclosure. As shown in FIG. 15, the CN entity includes: a reception module 1501, configured for receiving a tracking area updating (TAU) request transmitted by an access network entity, wherein the TAU request includes an identifier of the UE; a updating module 1502, configured for updating a Tracking Area Identity (TAI) list for the UE according to the TAU request, and obtaining the target TAI list; and a transmission module 1503, configured for transmitting the target TAI list to the access network entity.

Optionally, the reception module 1501 is configured for receiving the control-plane message or the user-plane message including the TAU request transmitted by the access network entity. The transmission module 1503 is configured for transmitting a control-plane message or a user-plane message including the target TAI list to the access network entity.

Optionally, the reception module 1501 is configured for receiving a NAS message including the TAU request transmitted by the access network entity; and the transmission module 1503 is configured for transmitting a NAS message including the target TAI list to the access network entity.

It should be noted that, the CN entity in the embodiment may be the CN entity in the embodiments shown in FIG. 1 to FIG. 6. Operations of the CN entity in the embodiments shown in FIG. 1 to FIG. 6 may be implemented by the CN entity in the embodiment, and same technical effects may be achieved and repeated description is not provided herein.

Figure 16:
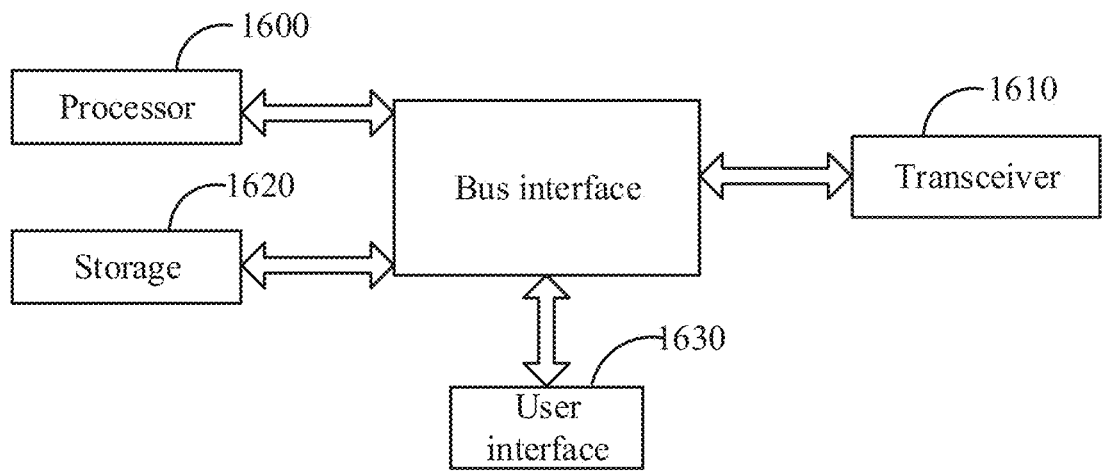
FIG. 16 is a structural schematic diagram of an access network entity provided in some embodiments of the present disclosure.

Referring to FIG. 16, FIG. 16 is a structural schematic diagram of an access network entity provided in some embodiments of the present disclosure. As shown in FIG. 16, the access network entity includes a processor 1600, a transceiver 1610, a storage 1620, a user interface 1630 and a bus interface. The processor 1600 is configured for reading programs in the storage 1620 and executing steps of: receiving a location-area updating request message transmitted by a UE; transmitting the location-area updating message to the UE, wherein the location-area updating message at least includes target Radio Access Network (RAN) notification area (RNA) information, the target RNA information is RNA information updated for the UE by the access network entity according to the location-area updating request message.

The transceiver 1610 is configured for transmitting data and receiving data under a control of the processor 1600.

In FIG. 16, a bus architecture may include any number of buses and bridges connected together. Specifically, a plurality of processors such as the processor 1600 and a plurality of storages such as the storage 1620 are connected together. The bus architecture may also cause any other circuits such as a peripheral circuit, a voltage regulator and a power management circuit to be connected together. The circuits are known in the art, and thus detailed descriptions thereof are not further provided herein. The bus interface provides an interface. The transceiver 1610 may include a plurality of elements such as receivers, transmitters, and units for communicating with other devices through a transmission medium. Directed to different user terminals, the user interface 1630 may also be an interface capable of being connected to external devices or internal devices including, but not limited to, keypads, displays, speakers, microphones, joysticks, or the like.

The processor 1600 takes charge of the bus interface and general processing transactions. The storage 1620 may store data used by the processor 1600 when the processor 100 performs operations.

Optionally, the processor 1600 is configured for, according to the location-area updating request message, determining whether the Tracking Area Identity (TAI) list of the UE needs to be updated or not. The transmitting the location-area updating message to the UE by the processor 1600, includes: if the TAI list of the UE needs not to be updated, updating the RNA information for the UE according to the location-area updating request message and obtaining the target RNA information; and transmitting the location-area updating message including the target RNA information to the UE.

Optionally, the processor 1600 is configured for, according to the location-area updating request message, determining whether the TAI list of the UE needs to be updated or not. Transmitting the location-area updating message to the UE by the processor 1600, includes: if the TAI list of the UE needs to be updated, transmitting the Tracking Area Updating (TAU) request to the CN entity according to the location-area updating request message; receiving the target TAI list transmitted by the CN entity, wherein the target TAI list is a TAI list updated for the UE by the CN entity according to the TAU request; and transmitting the location-area updating message including the target RNA information and the target TAI list to the UE.

Optionally, the location-area updating message includes the RNA updating request. The determining whether the TAI list of the UE needs to be updated or not according to the location-area updating request message by the processor 1600, includes: obtaining information of a target cell in the RNA updating request; determining whether the TAI list of the UE obtained in advance includes the identifier of the target cell or not; if the TAI list includes the identifier of the target cell, determining that the TAI list of the UE does not need to be updated; if the TAI list does not include the identifier of the target cell, determining that the TAI list of the UE needs to be updated.

Optionally, the location-area updating request message including the RNA updating request may encapsulate a RRC message including the RNA updating request.

Optionally, the location-area updating request message includes the RNA updating request and the TAU request, the processor 1600 is further configured for: parsing the TAU request from the location-area updating request message and transmitting the TAU request to the CN entity; receiving the target TAI list transmitted by the CN entity, wherein the target TAI list is the TAI list updated for the UE by the CN entity.

Transmitting the location-area updating message to the UE by the processor 1600, includes: transmitting the location-area updating message including the target RNA information and the target TAI list to the UE.

Optionally, the location-area updating request message encapsulates the RRC message including the RNA updating request and the non-access stratum (NAS) message including the TAU request. Parsing the TAU request from the location-area updating request message and transmitting the TAU request to the CN entity by the processor 1600, includes: parsing the NAS message including the TAU request from the location-area updating request message, and transmitting the NAS message to the CN entity. Receiving the target TAI list transmitted by the CN entity by the processor 1600, includes: receiving the NAS message including the target TAI list transmitted by the CN entity.

Transmitting the location-area updating message including the target RNA information and the target TAI list to the UE by the processor 1600, includes: transmitting the RRC message including the target RNA information and the NAS message including the target TAI list to the UE.

Optionally, the location-area updating request message encapsulates a RRC message including the RNA updating request and a RRC message including the TAU request. Parsing the TAU request from the location-area updating request message and transmitting the TAU request to the CN entity by the processor 1600, includes: parsing the RRC message including the TAU request and transmitting the control-plane message or the user-plane message including the TAU request to the CN entity. Receiving the target TAI list transmitted by the CN entity by the processor 1600, includes: receiving a control-plane message or a user-plane message including the target TAI list transmitted by the CN entity. Transmitting the location-area updating message including the target RNA information and the target TAI list to the UE by the processor 1600, includes: transmitting the RRC message including the target RNA information and the NAS message including the target TAI list to the UE.

Optionally, the processor 1600 is further configured for: updating RNA information for the UE according to the target TAI list and obtaining the target RNA information, wherein the target TAI list includes all cell identities corresponding to cells in the target RNA information and/or tracking area identities in a TAI list corresponding to the cells in the target RNA information.

It should be noted that, the access network entity in the embodiment may be the access network entity in the embodiments shown in FIG. 1 to FIG. 6. Operations of the access network entity in the embodiments shown in FIG. 1 to FIG. 6 may be implemented by the access network entity in the embodiment, and same technical effects may be achieved and repeated description is not provided herein.

Figure 17:
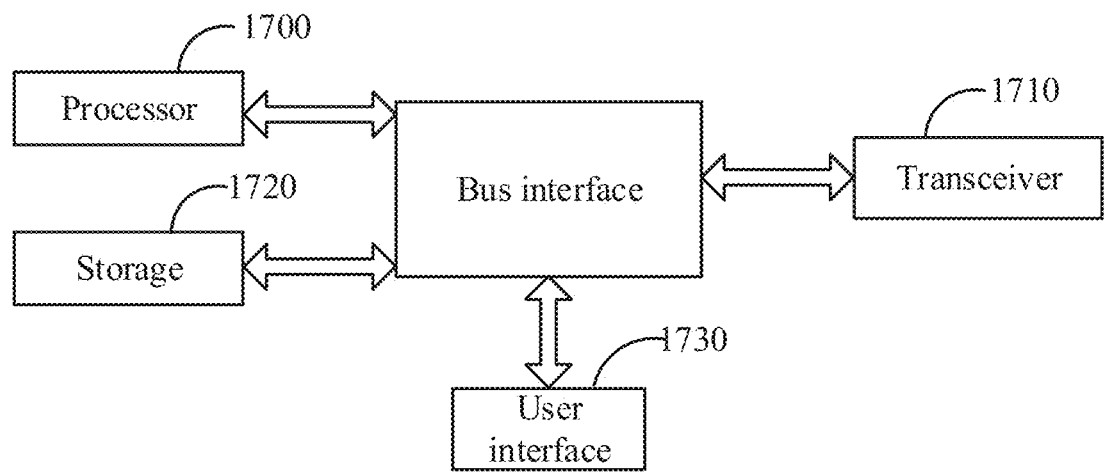
FIG. 17 is a structural schematic diagram of a UE provided in some embodiments of the present disclosure.

Referring to FIG. 17, FIG. 17 shows a structure of a UE. The UE includes a processor 1700, a transceiver 1710, a storage 1720, a user interface 1730 and a bus interface. The processor 1700 is configured for reading programs in the storage 1720 and executing steps of: transmitting a location-area updating request message to an access network entity; receiving the location-area updating message transmitted by the access network entity, wherein the location-area updating message at least includes a target Radio Access Network (RAN) notification area (RNA) information, the target RNA information is RNA information updated for the UE by the access network entity according to the location-area updating request message.

In FIG. 17, a bus architecture may include any number of buses and bridges connected together. Specifically, a plurality of processors such as the processor 1700 and a plurality of storages such as the storage 1720 are connected together. The bus architecture may also cause any other circuits such as a peripheral circuit, a voltage regulator and a power management circuit to be connected together. The circuits are known in the art, and thus detailed descriptions thereof are not further provided herein. The bus interface provides an interface. The transceiver 1710 may include a plurality of elements such as receivers, transmitters, and units for communicating with other devices through a transmission medium. The processor 1700 takes charge of managing the bus architecture and general processing transactions. The storage 1720 may store data used by the processor 1700 when the processor 1700 performs operations.

Optionally, the location-area updating request message includes a RAN notification area (RNA) updating request. The location-area updating message includes the target RNA information; or the location-area updating message includes the target RNA information and the target TAI list; wherein the target TAI list is the TAI list updated for the UE by the CN entity.

Optionally, the processor 1700 is further configured for, obtaining a current state of the UE; under a condition that the UE is in the in-active state, transmitting the location-area updating request message including the RNA updating request to the access network entity.

Optionally, the location-area updating request message includes the Radio Resource Control (RRC) message encapsulating the RNA updating request, the location-area updating message includes the RRC message encapsulating the target RNA information, or the location-area updating message includes the RRC message encapsulating the target RNA information and the RRC message encapsulating the target TAI list.

Optionally, the location-area updating request message includes the RNA updating request and the target-area updating (TAU) request. The location-area updating message includes the target RNA information and the target TAI list; wherein the target RAI list is the TAI list updated for the UE by the CN entity.

Optionally, the processor 1700 is further configured for, obtaining a current state of the UE; under a condition that the UE is in an idle state or a connected state currently, transmitting the location-area updating request message including the RNA updating request and the tracking area updating (TAU) request to the access network entity.

Optionally, the location-area updating request message includes the Radio Resource Control (RRC) message encapsulating the RNA updating request and the RRC message encapsulating the TAU request, the location-area updating message includes the RRC message encapsulating the target RNA information and the RRC message encapsulating the target TAI list.

Optionally, the location-area updating request message includes the Radio Resource Control (RRC) message encapsulating the RNA updating request and the NAS message encapsulating the TAU request, the location-area updating message includes the RRC message encapsulating the target RNA information and the NAS message encapsulating the target TAI list.

Optionally, the UE and the mobility management entity (MME) are in a same control-plane management function.

It should be noted that, the UE in the embodiment may be the UE in the embodiments shown in FIG. 1 to FIG. 6. Operations of the UE in the embodiments shown in FIG. 1 to FIG. 6 may be implemented by the UE in the embodiment, and same technical effects may be achieved and repeated description is not provided herein.

Figure 18:
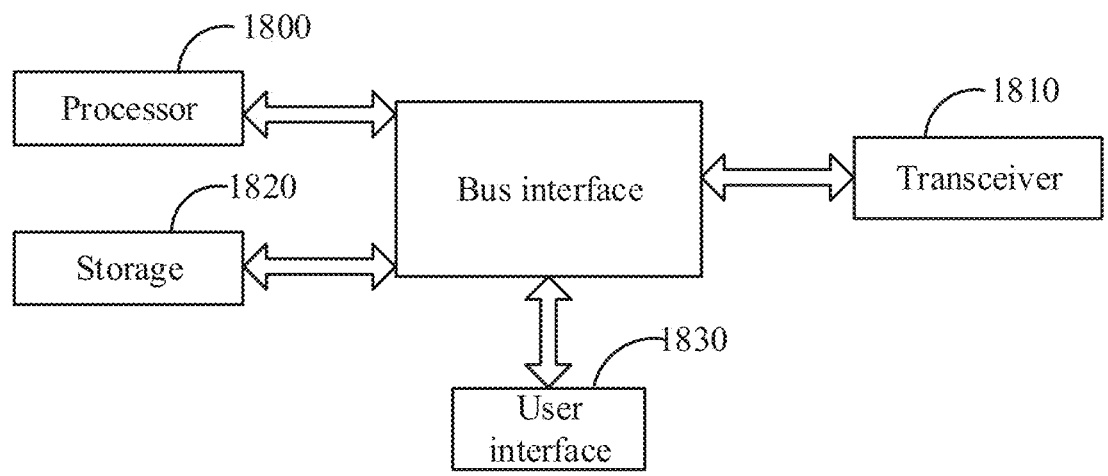
FIG. 18 is a structural schematic diagram of a core network entity provided in some embodiments of the present disclosure.

Referring to FIG. 18, FIG. 18 is a structural schematic diagram of a Core Network (CN) entity provided in some embodiments of the present disclosure. The CN network entity includes a processor 1800, a transceiver 1810, a storage 1820, a user interface 1830 and a bus interface. The processor 1800 is configured for reading programs in the storage 1820 and performing steps of: receiving a tracking area updating (TAU) request transmitted by an access network entity, wherein the TAU request includes an identifier of the UE; updating a tracking area identity (TAI) list for the UE according to the TAU request, and obtaining the target TAI list; transmitting the target TAI list to the access network entity.

In FIG. 18, a bus architecture may include any number of buses and bridges connected together. Specifically, a plurality of processors such as the processor 1800 and a plurality of storages such as the storage 1820 are connected together. The bus architecture may also cause any other circuits such as a peripheral circuit, a voltage regulator and a power management circuit to be connected together. The circuits are known in the art, and thus detailed descriptions thereof are not further provided herein. The bus interface provides an interface. The transceiver 1810 may include a plurality of elements such as receivers, transmitters, and units for communicating with other devices through a transmission medium. The processor 1800 takes charge of managing the bus architecture and general processing transactions. The storage 1820 may store data used by the processor 1800 when the processor 1800 performs operations.

Optionally, the processor 1800 receives a control-plane message or a user-plane message including the TAU request transmitted by the access network entity. The processor 1800 transmits the control-plane message or the user-plane message including the target TAI list to the access network entity.

Optionally, the processor 1800 receives a NAS message including the TAU request transmitted by the access network entity. The processor 1800 transmits a NAS message including the target TAI list to the access network entity.

In the embodiments of the present disclosure, the access network entity receives the location-area updating request message transmitted by the UE; the access network entity transmits the location-area updating message to the UE, wherein the location-area updating message at least includes target Radio Access Network (RAN) notification area (RNA) information, the target RNA information is RNA information updated for the UE by the access network entity according to the location-area updating request message. In this way, the method for updating the location area of the UE may update the TAU and the RNA in a coordinated manner, and may reduce signaling overheads and facilitate efficient management of location information of the UE.

It should be noted that, the CN entity in the embodiment may be the CN entity in the embodiments shown in FIG. 1 to FIG. 6. Operations of the CN entity in the embodiments shown in FIG. 1 to FIG. 6 may be implemented by the CN entity in the embodiment, and same technical effects may be achieved and repeated description is not provided herein.

It should be understood that, in the several embodiments provided in the present disclosure, the disclosed device and method can be implemented in other ways. The apparatus embodiments described above are only illustrative. For example, a division of units may be only one logically functional division. There may be other divisions in actual implementations, e.g, multiple units and components can be combined or integrated in another system, or some features may be omitted or not executed. Additionally, couplings, or direct couplings, or communication connections between displayed or discussed components may be implemented via some interfaces, and indirect couplings or communication connections between devices or units may be electrical coupling or connections, mechanical couplings or connections, or other forms of coupling or connections.

The functional units described in the embodiments of the present disclosure may be integrated in one processing unit or may be separated physically, or two or more of the units may be integrated in one device. The above integrated units may be implemented by hardware, or a functional unit including hardware and software.

The above integrated units implemented by the functional unit including software may be stored in a computer readable storage medium. The functional units including software stored the medium may include instructions for causing a computing device (which may be a personal computer, a server, a network device or the like) to perform some or parts of the method of the embodiments of the present disclosure. The storage medium may include mediums capable of storing codes, such as a USB disk, a removable disk, a Read Only Memory (ROM), a Random Access Memory (RAM), a Magnetic Disk, a Compact Disk, or the like.

The above described embodiments of the present disclosure are optional embodiments. It should be noted that numerous modifications and embellishments may be made by one of ordinary skills in the art without departing from the spirit of the present disclosure, and such modifications and embellishments also fall within the scope of the present disclosure.

What is claimed is:

1. A method for updating a location area of a User Equipment (UE), comprising:
   receiving, by an access network entity, a location-area updating request message transmitted by the UE;
   determining, by the access network entity according to the location-area updating request message, whether a Tracking Area Identity (TAI) list of the UE needs to be updated or not; and
   transmitting a location-area updating message to the UE by the access network entity, wherein the location-area updating message at least comprises target Radio Access Network (RAN) notification area (RNA) information, the target RNA information is RNA information updated for the UE by the access network entity according to the location-area updating request message, wherein, the transmitting the location-area updating message to the UE by the access network entity, comprises:
   under a condition that the TAI list of the UE needs to be updated, transmitting a Tracking Area Updating (TAU) request to a Core Network (CN) entity by the access network entity according to the location-area updating request message;
   receiving a target TAI list transmitted by the CN entity by the access network entity, wherein the target TAI list is updated for the UE by the CN entity according to the TAU request;
   transmitting the location-area updating message comprising the target RNA information and the target TAI list to the UE by the access network entity.

2. The method according to claim 1, wherein, the transmitting the location-area updating message to the UE by the access network entity, comprises:
   under a condition that the TAI list of the UE does not need to be updated, updating the RNA information for the UE by the access network entity according to the location-area updating request message, and obtaining the target RNA information; and
   transmitting the location-area updating message comprising the target RNA information to the UE by the access network entity.

3. The method according to claim 2, wherein the location-area updating request message comprises a RNA updating request, and
   the determining, by the access network entity according to the location-area updating request message, whether the TAI list of the UE needs to be updated or not, comprises:
   obtaining information of a target cell in the RNA updating request by the access network entity;
   determining, by the access network entity, whether the TAI list of the UE obtained in advance comprises an identifier of the target cell or not;
   under a condition that the TAI list comprises the identifier of the target cell, determining, by the access network entity, that the TAI list of the UE needs not to be updated; and
   under a condition that the TAI list of the UE does not comprise the identifier of the target cell, determining, by the access network entity, the TAI list of the UE needs to be updated.

4. The method according to claim 3, wherein, the location-area updating request message comprising the RNA updating request comprises a Radio Resource Control (RRC) message encapsulating the RNA updating request.

5. The method according to claim 1, wherein, the location-area updating request message comprises a RNA updating request and the TAU request, the method further comprises:
   parsing the TAU request from the location-area updating request message by the access network entity and transmitting the TAU request to a Core Network (CN) entity by the access network entity.

6. The method according to claim 5, wherein, the location-area updating request message comprises a Radio Resource Control (RRC) message encapsulating the RNA updating request and a Non-Access Stratum (NAS) message encapsulating the TAU request;

the parsing the TAU request from the location-area updating request message by the access network entity and transmitting the TAU request to the CN entity by the access network entity, comprises: parsing the NAS message encapsulating the TAU request from the location-area updating request message by the access network entity and transmitting the NAS message to the CN entity by the access network entity;

the receiving the target TAI list transmitted by the CN entity by the access network entity, comprises: receiving the NAS message comprising the target TAI list transmitted by the CN entity by the access network entity;

the transmitting the location-area updating message comprising the target RNA information and the target TAI list to the UE by the access network entity, comprises: transmitting, by the access network entity, a RRC message comprising the target RNA information and a NAS message comprising the target TAI list to the UE;

or the location-area updating request message comprises a RRC message encapsulating the RNA updating request and a RRC message encapsulating the TAU request;

the parsing the TAU request from the location-area updating request message by the access network entity and transmitting the TAU request to the CN entity by the access network entity, comprises: parsing the RRC message encapsulating the TAU request by the access network entity and transmitting a control-plane message or a user-plane message comprising the TAU request to the CN entity by the access network entity;

the receiving the target TAI list transmitted by the CN entity by the access network entity, comprises: receiving a control-plane message or a user-plane message comprising the target TAI list transmitted by the CN entity by the access network entity;

the transmitting the location-area updating message comprising the target RNA information and the target TAI list to the UE by the access network entity, comprises: transmitting, by the access network entity, a RRC message comprising the target RNA information and a RRC message comprising the target TAI list to the UE.

7. The method according to claim 1, further comprising: updating RNA information for the UE by the access network entity according to the target TAI list and obtaining the target RNA information, wherein the target TAI list comprises all cell identities corresponding to cells in the target RNA information and/or tracking area identities in a TAI list corresponding to the cells in the target RNA information.

8. The method according to claim 1, further comprising: transmitting the location-area updating request message to the access network entity by the UE, wherein the location-area updating request message is used by the access network entity to determine whether the TAI list of the UE needs to be updated or not;

receiving, by the UE, the location-area updating message transmitted by the access network entity, wherein the location-area updating message at least comprises target RNA.

9. The method according to claim 8, wherein the location-area updating request message comprises a RNA updating request;

under a condition that the TAI list of the UE does not need not to be updated, the location-area updating message comprises the target RNA information.

10. The method according to claim 8, wherein, the location-area updating request message comprises a RNA updating request and the TAU request.

11. The method according to claim 10, wherein, the location-area updating request message comprises a Radio Resource Control (RRC) message encapsulating the RNA updating request and a RRC message encapsulating the TAU request, the location-area updating message comprises a RRC message encapsulating the target RNA information and a RRC message encapsulating the target TAI list;

or the location-area updating request message comprises a RRC message encapsulating the RNA updating request and a Non-Access Stratum (NAS) message encapsulating the TAU request, the location-area updating message comprises a RRC message encapsulating the target RNA information and a NAS message encapsulating the target TAI list.

12. A User Equipment (UE), comprising:
a processor;
a transceiver, configured for transmitting and receiving data under a control of the processor;
a storage, configured for storing programs and data; and
a bus interface,
wherein the processor, the transceiver, and the storage communicate with each other through the bus interface, and the processor is configured for reading programs and data stored in the storage and executing the method according to claim 8.

13. The method according to claim 9, further comprising:
obtaining a current state of the UE by the UE;
under a condition that the UE is in an inactive state, not transmitting the TAU request by the UE, but transmitting the location-area updating request message comprising the RNA updating request to the access network entity.

14. The method according to claim 9, wherein, the location-area updating request message comprises a Radio Resource Control (RRC) message encapsulating the RNA updating request, the location-area updating message comprises a RRC message encapsulating the target RNA information, or the location-area updating message comprises the RRC message encapsulating the target RNA information and a RRC message encapsulating the target TAI list.

15. The method according to claim 1, comprising:
receiving, by a Core Network (CN) entity, the TAU request transmitted by the access network entity, wherein the TAU request comprises an identifier of the UE, and the TAU request is transmitted by the access network entity to the CN entity according to the location-area updating request message transmitted by the UE;
updating the TAI list for the UE according to the TAU request by the CN entity, and obtaining the target TAI list;
transmitting the target TAI list to the access network entity by the CN entity.

16. The method according to claim 15, wherein, the CN entity receives a control-plane message or a user-plane message comprising the TAU request transmitted by the access network entity;
the CN entity transmits a control-plane message or a user-plane message comprising the target TAI list to the access network entity.

17. The method according to claim 15, wherein, the CN entity receives a Non-Access Stratum (NAS) message comprising the TAU request transmitted by the access network entity;
    the CN entity transmits a NAS message comprising the target TAI list to the access network entity.

18. A Core Network (CN) entity, comprising:
a processor;
a transceiver, configured for transmitting and receiving data under a control of the processor;
a storage, configured for storing programs and data; and
a bus interface,
    wherein the processor, the transceiver, and the storage communicate with each other through the bus interface, and the processor is configured for reading programs and data stored in the storage and executing the method according to claim 15.

19. An access network entity, comprising:
a processor;
a transceiver, configured for transmitting and receiving data under a control of the processor;
a storage, configured for storing programs and data; and
a bus interface,
    wherein the processor, the transceiver, and the storage communicate with each other through the bus interface, and the processor is configured for reading programs and data stored in the storage and executing the method according to claim 1.

\* \* \* \* \*